United States Patent
Jacques De Kadt et al.

(10) Patent No.: US 10,911,371 B1
(45) Date of Patent: Feb. 2, 2021

(54) POLICY-BASED ALLOCATION OF PROVIDER NETWORK RESOURCES

(71) Applicant: Amazon Technologies, Inc., Seattle, WA (US)

(72) Inventors: Christopher Richard Jacques De Kadt, Seattle, WA (US); Matthew Shawn Wilson, Seattle, WA (US); John Merrill Phillips, Seattle, WA (US); Michael Groenewald, Western Cape (ZA); Jacobus Johannes Van Der Merwe, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 14/658,769

(22) Filed: Mar. 16, 2015

(51) Int. Cl.
| | | |
|---|---|---|
| G06F 15/173 | (2006.01) | |
| G06F 15/177 | (2006.01) | |
| H04L 12/24 | (2006.01) | |
| H04L 29/06 | (2006.01) | |
| H04L 29/08 | (2006.01) | |
| H04L 9/00 | (2006.01) | |
| H04L 12/911 | (2013.01) | |
| G06F 9/455 | (2018.01) | |

(52) U.S. Cl.
CPC ........ *H04L 47/783* (2013.01); *G06F 9/45533* (2013.01); *H04L 67/32* (2013.01)

(58) Field of Classification Search
CPC . H04L 12/5695; H04L 41/0896; H04L 47/24; H04L 12/14; H04L 41/0893; H04L 47/20; H04L 47/828
See application file for complete search history.

(56) References Cited

U.S. PATENT DOCUMENTS

| | | | |
|---|---|---|---|
| 8,122,282 B2 | 2/2012 | Betzler et al. | |
| 8,732,698 B2 | 5/2014 | Ling et al. | |
| 8,738,781 B2 | 5/2014 | Heim et al. | |
| 8,843,633 B2 | 9/2014 | Eriksson et al. | |
| 9,154,589 B1 * | 10/2015 | Klein | ..... H04L 69/329 |
| 2006/0053475 A1 * | 3/2006 | Bezilla | ..... G06F 21/552 |
| | | | 726/1 |

(Continued)

OTHER PUBLICATIONS

"Find and Buy Server Software and Services that Run on the AWS Cloud", AWS Marketplace, Accessed Feb. 2, 2015, 1 page.

(Continued)

*Primary Examiner* — Nicholas R Taylor
*Assistant Examiner* — Ho T Shiu
(74) *Attorney, Agent, or Firm* — Robert C. Kowert; Kowert, Hood, Munyon, Rankin & Goetzel, P.C.

(57) ABSTRACT

A control-plane component of a network-accessible service receives an indication that a resource request has been submitted by a client. The component determines, based at least in part on metadata associated with the client, that a first parameter selection policy (PSP) of one or more PSPs created for the service is applicable. The first PSP includes a condition set to determine applicability, and a value set indicating parameter values to be used to fulfill resource requests to which the PSP applies. Using the value set, an effective parameter value list for one or more operations to be performed to allocate the requested resource is generated, and the allocation operations are initiated.

20 Claims, 10 Drawing Sheets

(56) References Cited

U.S. PATENT DOCUMENTS

| | | | |
|---|---|---|---|
| 2006/0222008 A1* | 10/2006 | Aaron | H04L 41/0896 370/468 |
| 2008/0130656 A1* | 6/2008 | Kim | H04L 12/5695 370/395.21 |
| 2008/0313698 A1* | 12/2008 | Zhao | H04L 63/08 726/1 |
| 2011/0314466 A1 | 12/2011 | Berg et al. | |
| 2012/0102160 A1* | 4/2012 | Breh | G06F 9/5061 709/220 |
| 2013/0276057 A1 | 10/2013 | Smith et al. | |
| 2013/0311662 A1 | 11/2013 | Stolyar | |
| 2013/0347056 A1* | 12/2013 | Kuhlman | H04L 29/06 726/1 |
| 2014/0040975 A1* | 2/2014 | Raleigh | H04W 12/12 726/1 |
| 2014/0229621 A1 | 8/2014 | Song | |
| 2014/0229844 A1* | 8/2014 | De Armas | G06F 3/048 715/739 |
| 2014/0297868 A1* | 10/2014 | Ennaji | H04L 47/828 709/226 |
| 2015/0019699 A1* | 1/2015 | Postal | H04L 41/0681 709/221 |
| 2016/0021108 A1* | 1/2016 | Houston | H04L 63/20 713/168 |

OTHER PUBLICATIONS

"The Insider Threat", Miltiadis Kandias, Vasilis Stavrou, Downloaded Feb. 25, 2015, 1 page.

"Amazon Elastic Compute Cloud; CLI Reference", Amazon Web Services, API Version Oct. 1, 2014, pp. 1-830.

"Amazon Elastic Compute Cloud; User Guide for Linux", Amazon Web Services, API Version Oct. 1, 2014, pp. 1-673.

* cited by examiner

| Parameter | In case of conflict between PSP-k and client-specified value |
|---|---|
| Instance type | Client-specified value overrides |
| Instance count | Client-specified value overrides |
| Geographic location | PSP value overrides |
| Availability container | PSP value overrides |
| Security key | Client-specified value overrides |
| Security group | Client-specified value overrides |
| Instance role(s) | Client-specified value overrides |
| Tenancy mode | PSP value overrides |
| OS kernel | PSP value overrides |
| Block device mapping | Client-specified value overrides |
| Machine image ID | Client-specified value overrides |
| Public IP addresses | Client-specified value overrides |
| Private IP addresses | PSP value overrides |
| Isolated virtual network (IVN) ID | Client-specified value overrides |
| Hardware host specification | N/A (client cannot specify) |
| ... | ... |

"Launch-compute-instances" parameters 425

401 Instance type
402 Instance count
403 Geographic location
404 Availability container
405 Security key
406 Security group
407 Instance role(s)
408 Tenancy mode
409 OS kernel
410 Block device mapping
411 Machine image ID
412 Public IP addresses
413 Private IP addresses
414 Isolated virtual network (IVN) ID
415 Hardware host specification

FIG. 4

At a network-accessible service of a provider network, implement programmatic interfaces (e.g., web-based wizard or editor, API set, GUI or command line tools) enabling clients to view/create/modify parameter selection policies (PSPs) for one or more types of resource requests; each PSP includes a condition set to determine its applicability to a resource request, and a value set indicating parameter values to be selected for applicable requests 801

Optionally, generate and publish one or more service-defined PSPs, e.g., "best-performance" PSP or "low-cost" PSP, to which clients can subscribe (e.g., in "auto-update" mode, enabling the service to modify PSP value settings when new types of hardware/software resources become available at provider network) 804

Store client-specified and/or service-defined PSPs, together with subscription information, in service metadata repository 807

Receive clients' PSP management requests via programmatic interfaces, provide query responses (e.g., PSP applicability queries, difference queries), save any changes resulting from PSP modification requests in repository 810

*FIG. 8*

POLICY-BASED ALLOCATION OF PROVIDER NETWORK RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Over time, many fairly advanced features and capabilities have been added to the virtualized computing servers (also known as guest virtual machines or compute instances) offered at some provider networks. For example, it may be possible for a client to select from among many different compute instance types, with respective computing, storage and memory capacities. Similarly, a number of different options may be available to clients with respect to networking configuration, such as whether a given compute instance is to be included within an isolated virtual network or not, whether one or more public network addresses are to be assigned to the compute instance, and so on. A variety of options may also be available for the types of backing storage devices (e.g., local versus off-host storage) to be used for a compute instance, security configurations, pre-configured software stacks, and so on. Thus, a large number of choices may have to be made when a client requests a new compute instance. Similarly, other resource allocation requests directed to a virtual computing service (or other network-accessible services of the provider network, such as storage services or database services) may also offer a multiplicity of potentially confusing configuration options. For at least some clients, selecting the appropriate combination of options for resource requests may not be a straightforward exercise. Furthermore, administrators of the business entities whose employees utilize the network-accessible services may in some cases wish to enforce rules or goals with respect to resource allocations performed on behalf of the employees, e.g., to enforce uniformity and/or to control costs.

BRIEF DESCRIPTION OF DRAWINGS

FIG. 4 illustrates example parameters of a request to launch compute instances, according to at least some embodiments.

FIG. 8 is a flow diagram illustrating aspects of operations that may be performed to respond to administrative requests pertaining to PSPs, according to at least some embodiments.

Figure 1:
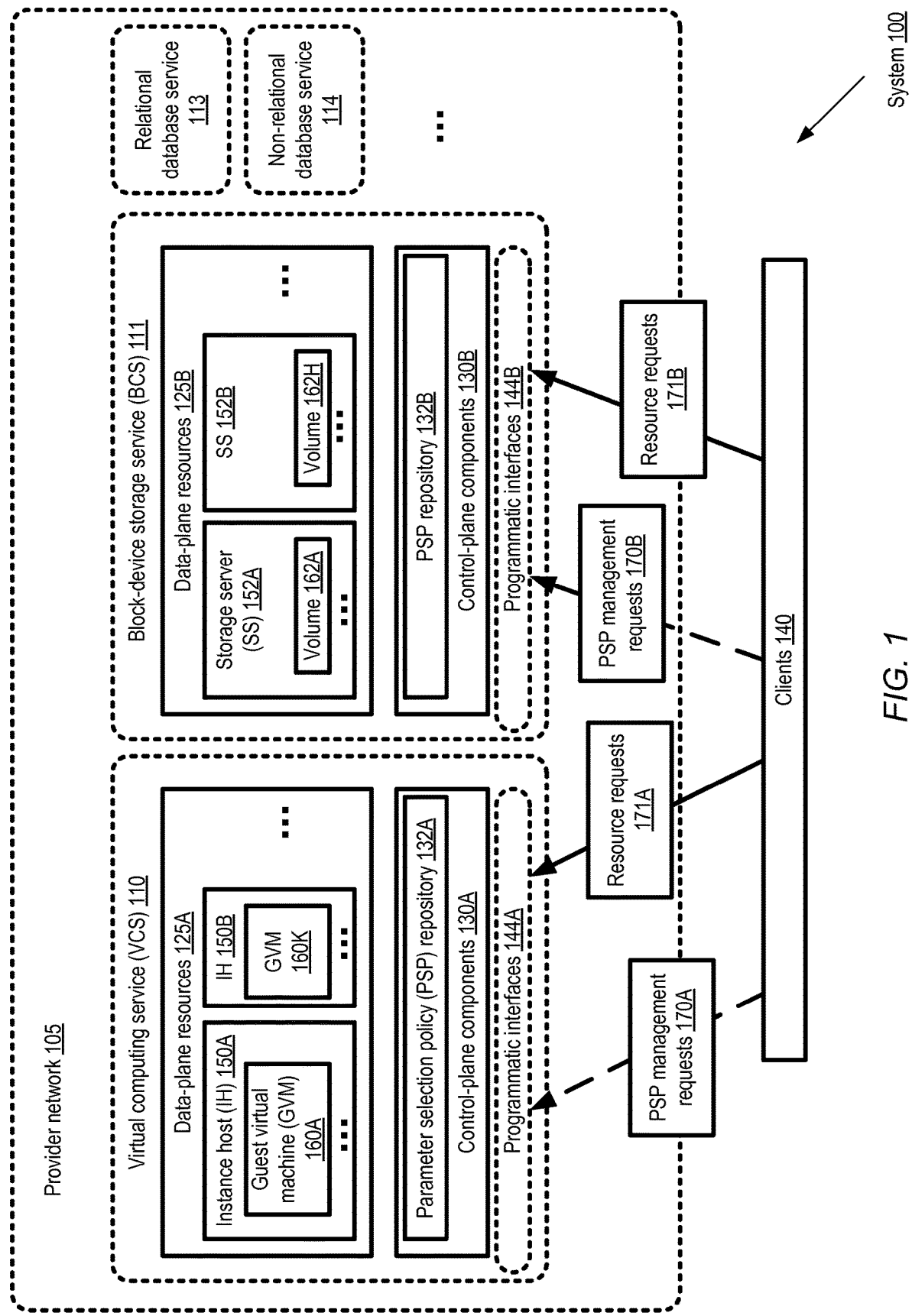
FIG. 1 illustrates an example system environment in which policy-based allocation of resources is implemented at one or more network-accessible services of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting policy-based resource allocation at one or more network-accessible services of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtual computing service (VCS) may instantiate several different guest virtual machines on behalf of respective clients at a given hardware server, without necessarily informing any of the clients that the hardware server is being shared with other clients. Such guest virtual machines may also be referred to herein as "compute instances" or simply as "instances", and the hardware servers on which one or more compute instances are executed may be referred to as "instance hosts" or "virtualization hosts". A provider network may support single-tenant resource allocation at one or more services in some embodiments, either in addition to, or instead of, multi-tenant resource allocation, and a resource such as an instance host may be used in single-tenant mode or multi-tenant mode during a given time period. A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

Several of the network-accessible services of a provider network, including for example the VCS and various storage-related services, may allow clients to request the allocation of resources programmatically, e.g., via application programming interfaces, web-based consoles, command-line tools, graphical user interfaces and the like. A client may request the allocation of one or more compute instances from the VCS, one or more volumes from a storage service that provides block-device level interfaces, and so on. As more and more features are implemented at the provider network's services over time, the number of combinations of possible configuration settings that can be selected for a given resource may increase dramatically. For example, with respect to compute instances, the VCS may support multiple "instance types" (each with distinct computing, storage, networking and/or memory capacities), a number of distinct storage device types for the data associated with an instance, various networking-related choices including the number and types of IP (Internet Protocol) addresses to be used for the instance, the specific virtual machine image to be used for a given instance, numerous security-related settings, and so on. In some cases, the choice made for one configuration setting may influence the choices available for other settings—for example, in one embodiment, if a client chooses a "small" instance type for a compute instance (e.g., from among a set of "small", "medium" or "large" instance types defined by a VCS), the networking options may be more limited than if the client had chosen the "large" instance type. As a result of the multiplicity of parameters, the number of choices available for various parameters, and the possible constraining relationships among different parameters, selecting the appropriate combination of parameter settings to use may not be straightforward for at least some users of the services. Furthermore, the pricing and billing policies associated with different combinations of resource allocation parameter settings may differ, and as a result the cost of the parameters selected may also have to be considered by the service users. As newer versions of hardware and software become available, the provider network operator may also be faced with the problem of replacing the older versions (or supporting both new and old versions), while minimizing the changes to the programmatic interfaces implemented for client resource requests.

In order to reduce or overcome at least some of these kinds of problems, in some embodiments one or more services of the provider network may implement support for parameter selection policies (PSPs). One or more PSPs may be set up, e.g., either by the service or by a client (e.g., an administrator of a business entity whose employees utilize the service), corresponding to a given type of resource allocation request such as a request to launch compute instances. A PSP may be used, e.g., in combination with the client's specified parameter choices (if any) for a given resource request, to arrive at a final or effective set of parameter settings to be used to respond to the resource request. In some embodiments, a given PSP may include at least one condition, indicating the circumstances or conditions under which the PSP is to be applied to a given resource request, and at least one parameter value to be selected for a resource request to which the PSP applies. More generally, a PSP may comprise a condition set with one or more conditions (e.g., combined using Boolean logic and/or "if-then-else" branching logic) and one or more corresponding parameter value sets in at least some embodiments. PSPs and/or their components may also have a number of attributes (described in further detail below), such as whether a given value can be modified automatically by the service or whether clients have to approve any changes. PSPs may be designed and used with various high-level objectives in various embodiments: for example, to reduce the complexity of the choices that have to be made by at least some subsets of service users when requesting resources, to support business goals (e.g., budget goals, or consistency goals with respect to resource use) of client enterprises or individual clients, to allow the provider network operator to upgrade hardware and/or software without requiring clients to change the way they interact with the provider network's services, and so on. At the same time, in the PSP infrastructure may be designed to allow so-called "power users" or expert clients to continue to make detailed choices for configuring resources; that is, for at least some types of service requests, the support for PSPs may not constrain the configuration flexibility afforded to knowledgeable clients.

In at least some embodiments, one or more control-plane components of a network-accessible service such as the VCS may store representations of various PSPs (e.g., text forms of policy descriptors, scripts or executable programs) associated with the service in a persistent repository. The term "control-plane components" may be used herein to refer to entities that are responsible for the configuration and administration of service resources (such as compute instances and instance hosts in the case of a VCS), as opposed to "data-plane components" which are involved in implementing non-administrative application-related operations. In some embodiments, a service's control-plane may include several layers of components, such as a front-end layer of work request receivers and a back-end layer of servers at which the bulk of the business logic of the control-plane is implemented. In the latter scenario, for example, a front-end control-plane component may receive a client's resource request and transmit corresponding internal requests to the back-end servers based on applicable PSPs stored in the repository. The stored PSPs may be indexed and/or searchable based on various attributes in some embodiments, such as identifiers of the clients (or client accounts) to which the PSPs may apply, the types of resource requests to which the PSPs may apply, the PSPs' creation time, and so on. In some embodiments, each service may maintain its respective PSP repository, while in other embodiments at least some PSPs (e.g., PSPs for resources whose configuration may involve interactions between several services) may be accessible from the control-plane of more than one service.

An indication of a client-submitted resource allocation request may be received at the control-plane components of the service. The request may indicate, for example, the particular type of resource (e.g., "compute instance" or "storage volume") to be allocated, as well as zero or more client-specified values of parameters for the resource. In at least some embodiments, the request may also include an explicit or implicit identification of the requesting client— e.g., a user name, a client account name, or a requester network address from which the identity of the requester can be determined. The control-plane components may determine, e.g., based at least in part on such identity metadata associated with the requesting client and/or at least in part on the condition sets defined for the various PSPs, that a particular PSP applies to the received request.

Consider an example scenario in which a client C1 with account identifier A1 sets a parameter P1 for a resource type R1 to a value V1 when submitting a resource request. The control-plane components may find a particular PSP (PSP1), created earlier for R1 requests from clients whose account identifier is A1, comprising the logical equivalent of "if P1's client-supplied value is in the set (V1, V2, V3) then set the value of parameter P2 to Vk, P3 to Vg, . . . ". Accordingly, because the identity metadata of the client (i.e., the account identifier A1) matches the identity specified for PSP1 applicability, and the client-specified parameter value (V1) for P1 matches the condition set ("if P1's client-supplied value is in the set (V1, V2, V3"), the control-plane components may determine the PSP1 applies to R1. Using the value set designated in PSP1 ("set P2 to Vk, P3 to Vg, . . . "), and/or the client's specified parameter values (e.g., V1) the control-plane components may generate an effective parameter value list (e.g., values for all the parameters P1, P2, P3, . . . ) needed for one or more APIs that may be invoked to fulfill the client's request R1. In this example scenario, the effective parameter value list (EPVL) may include some values that were specified by the client and others that were specified by the PSP. In some embodiments, depending for example on various overriding-related attributes of the PSPs, some EPVLs may comprise only PSP-specified values, while others may comprise only client-specified values (e.g., if client-specified values are to override PSP-specified values). After the EPVL has been obtained, the control-plane components may initiate the allocation or acquisition of the requested resources using the EPVL, e.g., by invoking the appropriate APIs to the appropriate resource allocators. In some implementations, the EPVL may be used for internal APIs that are not exposed for direct use by the clients, while in other implementations at least some of the EPVLs may be used for client-accessible APIs.

As mentioned earlier, a number of different types of resource requests could be handled using PSPs in various embodiments, and a variety of policy-specified configuration settings could be selected for each type of request. In one embodiment, in which PSPs are used for requests to launch or run one or more compute instances or guest virtual machines, for example, an effective parameter value list generated using a PSP may include, for example, an identifier of a virtual machine image to be used, an instance type (e.g., selected from a family of supported instance types such as "small", "medium" or "large") and/or an instance count. In addition, one or more security-related parameter values may also be generated using PSPs, such as a security key or a security group (a set of rules specifying a virtual firewall, indicating constraints on incoming and outgoing traffic), or an instance role (e.g., associated with a set of permissions for various APIs that may be invoked from the instance) defined by an identity and access management service of the provider network. In some embodiments, in which the provider network comprises numerous geographically-dispersed data centers, some location-related parameters may also be selected for an instance using PSPs. Such parameters may include a geographical region, a group of data centers or a specific data center, or a targeted availability container. An availability container may comprise portions or all of one or more distinct locations or data centers, engineered in such a way (e.g., with independent infrastructure components such as power-related equipment, cooling equipment, or physical security components) that the resources in a given availability container are insulated from failures in other availability containers. Other parameters included in an instance launch request may include a tenancy indicator (e.g., whether the instance is to be set up on a multi-tenant instance host or a single-tenant instance host), an operating system kernel identifier, a block device mapping for storage to be used from the instance, or one or more IP addresses to be assigned to the instance. In some embodiments, an EPVL may include a hardware specification for a host at which the instance is to be instantiated (e.g., a server with N X-GHz CPUs, K GB of memory, and so on). Values of some of the parameters such as the hardware specification may be for internal use only within the provider network, e.g., such parameter settings (and/or the corresponding internal APIs) may not be exposed to clients. Other resource requests which are not necessarily related to instance launches, such as requests for storage volumes, may have corresponding sets of EPVLs created, such as the size of the volume, the type of storage technology (e.g., solid-state drives versus rotating magnetic disk devices), the type of storage server (single-tenant versus multi-tenant), and so on.

In at least one embodiment, a service such as a VCS may implement a variety of programmatic interfaces enabling clients to view, browse or compare PSPs, to edit and save PSPs, to subscribe to PSPs, and/or to determine which PSPs may be applicable to a client's request. A subscription request from a client may, for example, indicate one or more PSPs to be used for subsequent resource requests submitted by the client (or by a group of clients affiliate with a given client account). Some services may define a set of PSPs whose names indicate high-level goals with respect to resource allocation, such as "best-performing" or "low-cost" PSPs with respect to instance launch requests. Clients that subscribe to such service-defined policies may be able to rely on the service to translate the high-level goals into the appropriate configuration choices. That is, in at least some implementations, clients may allow the service to select parameter values corresponding to the high-level goals, and to change the parameter values that are selected as new versions of hardware or software become available, without requiring explicit approvals from the clients. In at least one embodiment, one or more of the provider network services may define their own PSP definition languages, e.g., a set of tokens and a grammar that can be used by clients to define new PSPs. "Wizards" or other tools to guide clients through the process of defining PSPs may be provided in some embodiments. In at least one embodiment, precedence settings may be associated with one or more parameters for which values are indicated in a PSP, e.g., to indicate whether a PSP-specified value for a parameter should override a client-specified value, or if a client-specified value should override the PSP-specified value.

In at least one embodiment, third-party PSPs, i.e., policies established by entities other than the provider network services and the clients of the services, may be supported. For example, some provider networks may allow business partners to vend software products (which can be run on provider network resources), such as machine learning products, specialized data analysis products, and the like via online marketplaces. For some types of such marketplace products, virtual machine images that include the vended software may be required. The third party product providers may identify certain optimal or preferred combinations of configuration settings (e.g., for compute instances or other provider network resources that are to be used in conjunction with their products), and generate corresponding PSPs. Such vendor-specific PSPs may then be used by the appropriate provider network service control-plane to allocate the resources used in conjunction with the corresponding vended products. In some embodiments, a vendor of a particular marketplace product may use a PSP to enforce certain constraints on the resources that are used for the product—e.g., a purchaser of the product may not be permitted to perform some set of configuration changes, such as programmatically detaching a storage volume, disabling a particular software or hardware component, and so on. Various types of access control rules associated with a marketplace offering may be specified and/or enforced using PSPs in different embodiments. In one embodiment, third party PSPs may be generated and used at online marketplaces that may not necessarily be directly affiliated with, or implemented fully within, the provider network. In one embodiment, various entities may generate and share (or sell) PSPs independently of online marketplace products— e.g., if a university or research group discovers an optimal combination of configuration settings for some type of computing task, they may publish the PSPs for use by other entities that wish to perform similar computing tasks.

Example System Environment

FIG. 1 illustrates an example system environment in which policy-based allocation of resources is implemented at one or more network-accessible services of a provider network, according to at least some embodiments. As shown, system 100 includes a provider network 105 in which a number of network-accessible services are implemented. The provider network may include, for example, a virtual computing service (VCS) 110, a block-device storage service (BCS) 111, a relational database service 113, a non-relational database service 114, and so on. Some of the services may utilize resources of other services—for example, the relational database service may utilize compute resources of the VCs and storage volumes implemented at the BCS. In general, each service may comprise a set of control-plane or administrative components, as well as a set of data-plane or non-administrative resources used primarily for client applications. Thus, VCS 110 includes control-plane components 130A and data-plane resources 125A, while BCS 111 includes control-plane components 130B and data-plane resources 125B. (The control-plane and data-plane components of the database services are not shown in FIG. 1.) Data-plane resources 125A of the VCS may include, for example, a collection of instance hosts (IH) 150, such as IH 150A and IH 150B. Each instance host may comprise one or more compute instances or guest virtual machines (GVMs) 160, such as GVM 160A at IH 150A and GVM 160K at IH 150B. Data-plane resources 125B of the BCS may include a plurality of storage servers (SS) 152, such as SS 152A and SS 152B. Each storage server in turn may include portions or all of one or more storage volumes accessible using block-device level interfaces, such as volume 162A at SS 152A and volume 162H at SS 152B.

The control-plane components of each of the various services of provider network 105 may be responsible for configuring the corresponding data-plane resources, e.g., in response to resource requests 171 received from clients 140, such as resource requests 171A directed to the VCS 110 and resource requests 171B directed to the BCS 111. Each service may implement a set of programmatic interfaces 144, such as interfaces 144A of the VCS and interfaces 144B of the BCS, enabling clients to submit resource requests 171. In addition, in the depicted embodiment, the programmatic interfaces 144 may be used by clients to submit requests associated with parameter selection policies (PSPs) to be used to respond to resource requests 171. At least some of the services may comprise respective PSP repositories 132 (e.g., repository 132A of the VCS 110 and repository 132B of the BCS) within their respective control-planes in some embodiments. A given PSP stored in a repository 132 may indicate the business logic or rules to be used to determine configuration parameter settings for various resources indicated in requests 171. In some embodiments, a PSP may indicate a set of conditions to determine the applicability of the PSP to a given resource request 171, as well as a corresponding set of one or more parameter values to be used for those resource requests to which the PSP is applicable. A number of different types of applicability conditions may be specified in different embodiments as described below in further detail, such as conditions that match client-specified parameter values indicated in the resource request, conditions defined in terms of the operating environment such as the time of day at which the request is received, or account-specific conditions. Some PSPs may be generated by services such as the VCS or the BSS, while others may be created by clients 140 using programmatic interfaces 144. In some embodiments, PSP repositories may be shared by a plurality of network-accessible services of a provider network.

In response to receiving an indication of a client-submitted resource request 171, a control-plane component of a service may check to see whether any PSPs apply the request. Depending on client identity metadata indicated explicitly or implicitly in the request (e.g., a client account identifier, user identifier, connection identifier or network address), on the applicability conditions defined in the PSPs stored in the repositories 132, and/or on other factors, the control-plane component may be able to identify one or more PSPs that apply to a given request. If more than one PSP applies, in some embodiments the control-plane component may have to prioritize among the PSPs, or resolve conflicts among the PSPs. Based at least in part on the parameter values (if any) indicated by the client in the request 171, and at least in part on the parameter values specified in the applicable PSP(s), the control-plane components may generate an effective parameter value list (EPVL) for the request. A given EPVL may contain some combination of the parameter values specified by the PSP and the values specified in the request (if any) in the depicted embodiment. The EPVL may then be used by the control-plane of the service to initiate the allocation of data-plane resources to fulfill the client's request. In some cases, a request submitted to one service may result in internal requests being submitted to additional services—e.g., a request to launch an instance at the VCS 110 may result in an internal API call directed at the BCS, or a request to set up a database instance at non-relational database service 114 may lead to one or more internal API calls directed to the VCS 110 or the BSS 111. In such scenarios, more than one EPVL may be generated, e.g., an EPVL may be created for each of the APIs to be invoked in response to a given client request.

The programmatic interfaces 144 may be used by clients to view/compare available or applicable PSPs, to subscribe to various PSPs (e.g., to indicate that a PSP should be used for subsequent resource requests from the client), and to create or modify existing PSPs to which modifications are permitted by the corresponding services. In some embodiments, the services may define PSPs that are intended to help clients achieve high-level goals, such as a "high-performance" PSP or a "low-cost" PSP. Clients that subscribe to such a service-defined goal-oriented PSP may allow the corresponding service to select the appropriate parameters for the resource requests, and/or to change the parameter values that are used to achieve the goals as needed.

It is noted that while the VCS is used as an example of a network-accessible service at which PSPs may be supported in much of the following description, the techniques described may be used for a variety of other network-accessible services as well. Not all the services implemented at a provider network may utilize PSPs for responding to client resource requests in some embodiments. In some embodiments, for example, PSPs may be supported at storage or database-related services, but not for a VCS. In at least one embodiment, PSPs may be implemented for responding to requests received at a given service from other provider network services, e.g., in addition to or instead of being used for requests received from external customers. Thus, in such embodiments, the clients from which resource requests are handled at a given service's control-plane may include entities either within the provider network or outside the provider network.

Generating PSP-Based Effective Parameter Values

Figure 2:
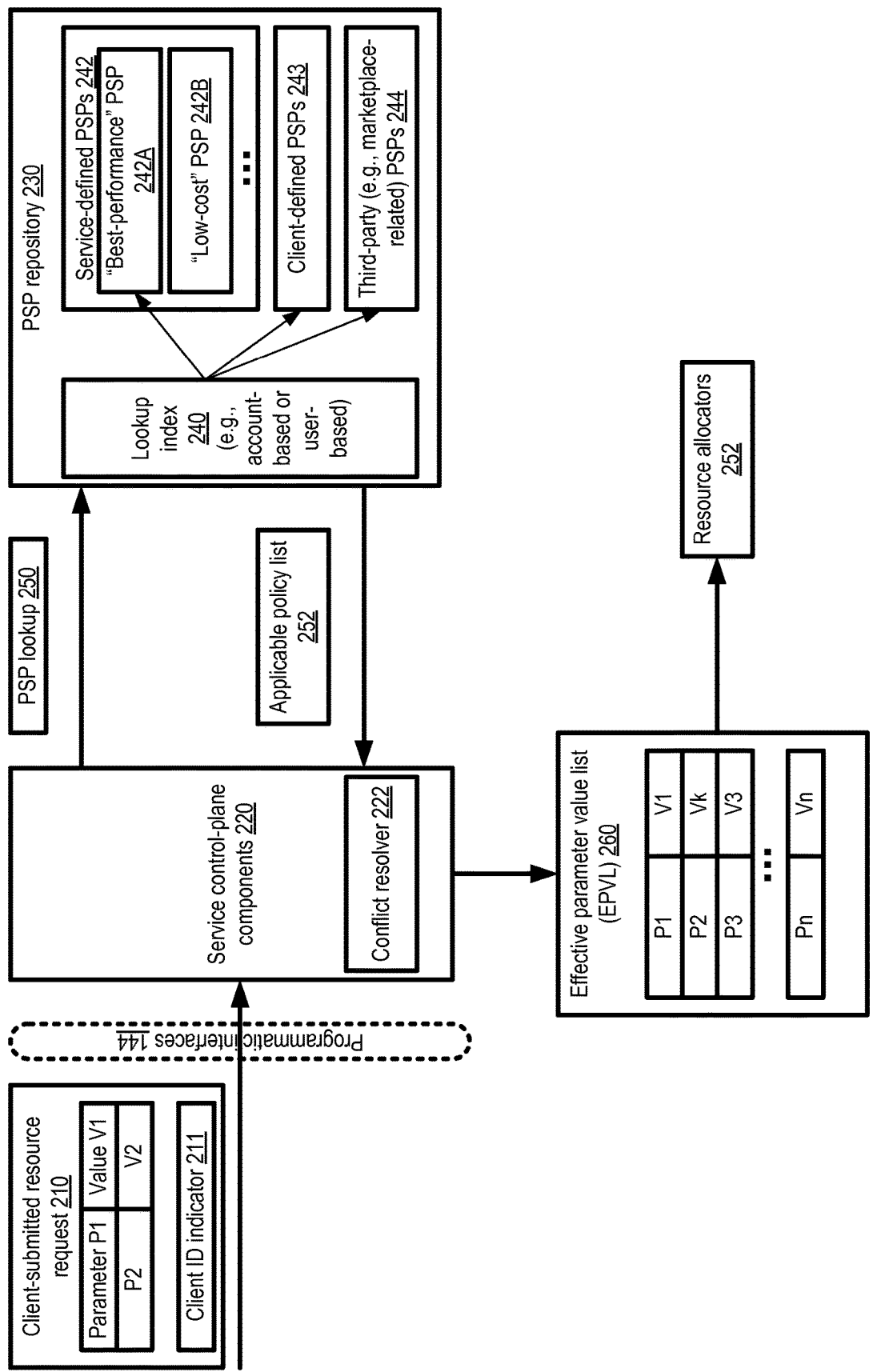
FIG. 2 illustrates an example of generating a policy-based effective parameter value list by a control-plane component of a network-accessible service, according to at least some embodiments.

FIG. 2 illustrates an example of generating a policy-based effective parameter value list by a control-plane component of a network-accessible service, according to at least some embodiments. One or more control-plane components 220 of a network-accessible service may receive an indication of a resource request 210. The request 210 may include client-selected values for one or more configuration parameters such as values V1 and V2 for parameters P1 and P2 respectively, as well as an indicator 211 of the requesting client's identity. In some implementations, the indicator may comprise an account identifier or client identifier, while in other implementations an the client's identity may be provided implicitly rather than explicitly, e.g., in the form of a connection identifier or a network address that can be used to infer the client's identity. The different types of indicators 211 that may be used to identify the requester may collectively be referred to herein as identity metadata of the client. As mentioned earlier, in some cases a component of a different provider network service may submit the resource request; that is, both internal clients within the provider network, and external clients outside the provider network (e.g., within customer-owned premises or on the public Internet) may be supported using PSPs in at least some embodiments.

The control-plane component 220 may perform a lookup or search operation 250 within a PSP repository 230 to determine whether any PSPs apply to the received request 210. In some embodiments, the repository 230 may include one or more indexes 240 that may be used to find applicable PSPs quickly. Such a lookup index 240 may, for example, utilize client account identifiers, user identifiers or other identity metadata as index keys in some embodiments. Indexes 240 may also or instead be constructed using other types of keys in various embodiments, such as the names of request parameters (e.g., P1 or P2) that may be included in PSP condition sets. In some implementations, indexes 240 may not be generated if the total number of PSPs, or the combined size of the PSP objects, in the repository 230 is below a threshold. An applicable policy list 252 comprising zero or more PSPs may be obtained from the repository 230 in response to the lookup or search in the depicted embodiment.

As mentioned earlier, some PSPs in the repository may be service-defined, while others may be defined by clients or third parties. In the depicted embodiment, service-defined PSPs 242 may include a "best-performance" PSP 242A and a "low-cost" PSP 242B for a particular type of resource request. Client-defined PSPs 243 may be generated using tools and/or wizards implemented by the service, and may be checked for correctness with respect to a service-published definition language before they are stored in the repository 230 in some embodiments. Similarly, third-party PSPs 244 may be produced, for example by vendors that sell products to be executed using service-provided resources, using programmatic interfaces implemented by the service. Such third-party PSPs may be validated before being saved in the same manner as client-defined PSPs in the depicted embodiment.

It may be the case that more than one PSP 242, 243 or 244 may apply to a given resource request 210 in the depicted embodiment. A number of different approaches may be taken towards resolving potential conflicts among applicable PSPs in various embodiments. In one embodiment, for example, a conflict resolver 222 of the service control-plane may attempt to find the most recently-generated PSP among the applicable set of PSPs, and use that one to generate an effective parameter value list 260 to be submitted to one or more resource allocators 252 to fulfill the client's request. The effective parameter value list (EPVL) 260 may include values for all the parameters that are required to allocate the requested resource or resources, such as P1, P2, P3, . . . , Pn in the depicted embodiment. In another approach towards conflict resolution, the condition sets of the applicable PSPs may be compared, and the PSP with the "narrowest" or most restrictive condition set among them may be selected as the one whose value set is used to generate the EPVL 260. If the client had specified a particular value (such as value V2 for parameter P2), and an applicable PSP specifies a different value (e.g., Vk) for the same parameter, the conflict may be resolved using override settings indicated in the PSP in some embodiments, as described below in further detail with respect to FIG. 3. In the scenario illustrated in FIG. 3, the EPVL includes a different effective value (Vk) for parameter P2 than was specified in the request 210, indicating that the service-specified value overrode the client-specified value.

Example PSP and Resource Request Contents

Figure 3:
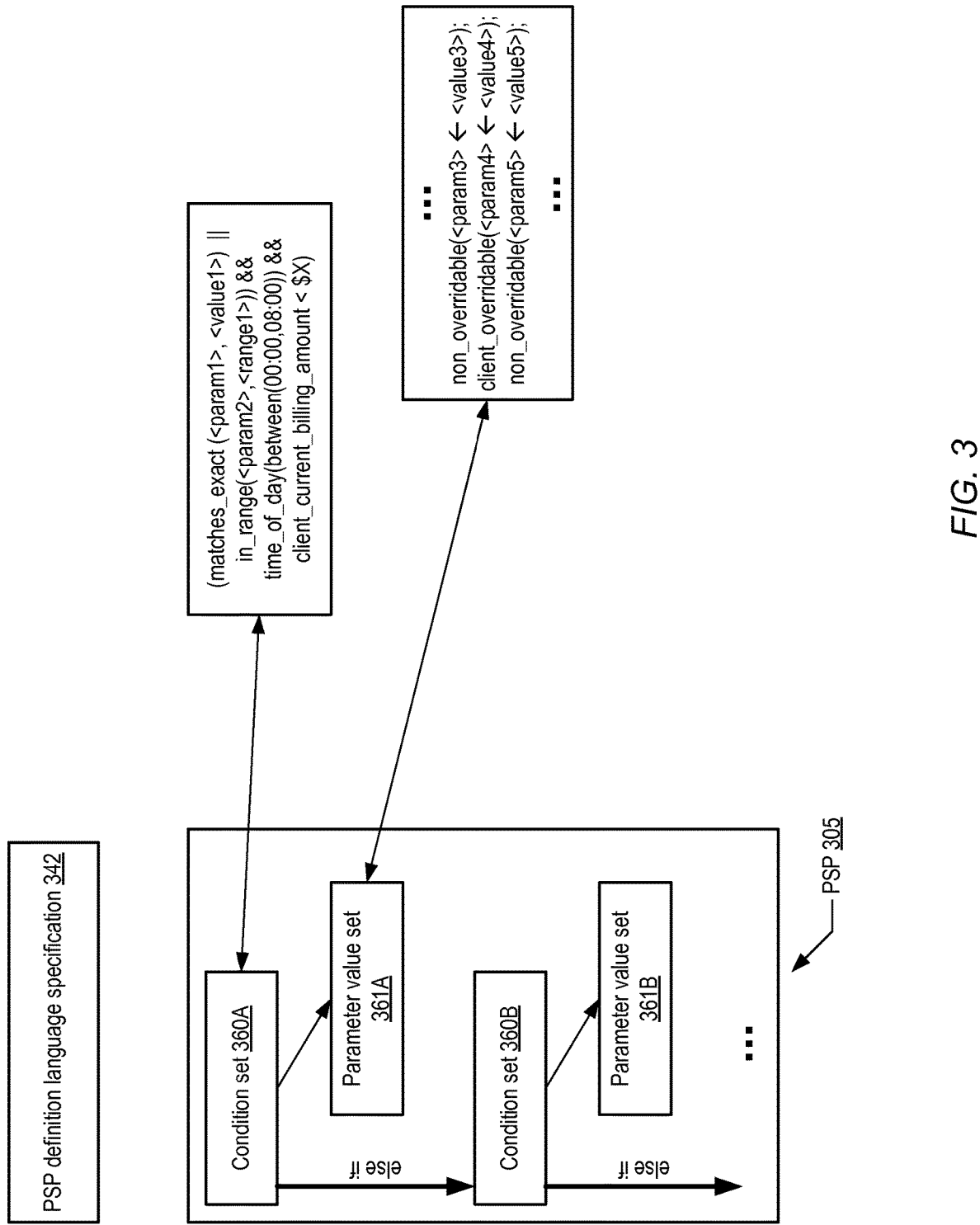
FIG. 3 illustrates example contents of a parameter selection policy (PSP) which may be used at a network-accessible service, according to at least some embodiments.

FIG. 3 illustrates example contents of a parameter selection policy (PSP) 305 which may be used at a network-accessible service, according to at least some embodiments. A PSP definition language specification 342 may be published by one or more network-accessible services of the provider network to help those customers that wish to generate their own PSPs to do so. In some embodiments, specification 342 may indicate a syntax that is based on well-known scripting languages or programming languages, such as JSON (JavaScript Object Notation), Python, XML (Extensible Markup Language) or the like. In other embodiments, a proprietary syntax may be used. The provider network may provide tools such as PSP editing plug-ins or add-ons to popular software development frameworks (e.g., Eclipse), and/or web-accessible wizards for guided PSP creation in some embodiments.

In some embodiments, a PSP 305 may be comprise an "if-then-else" control flow. For example, if condition set 360A applies to a resource request being considered in the depicted example, then parameter value set 361A may be used to generate the effective parameter value list or EPVL. Otherwise, if condition set 360B applies, parameter value set 361B may be used, and so on. Other types of control-flow constructs, such as constructs similar to the "case" or "switch" statements supported in C++ or Java™ respectively, may be supported in other implementations instead of or in addition to if-then-else constructs. In at least one implementation, a given PSP 305 may only be permitted to include a single condition set and a corresponding parameter value set, and control-flow structures may not be used.

In the depicted example, a given condition set may itself include several different clauses connected using Boolean operators. For example, condition set 360A contains four clauses that can be used to check whether the PSP applies to a particular resource request R1. If R1 includes a client-specified value <value1> for a parameter <param1>, a check of the first clause ("matches_exact(<param1>, <value1>)") would succeed. If the client-specified value of a second parameter <param2> is within a range <range1>, a check of the second clause ("in_range(<param2>,<range1>)") would also succeed. The third clause of the condition set in the depicted example "time_of_day(between(00:00, 08:00))", is used to check whether the time at which the request R1 was received falls within a specified range of hours (midnight and 8 am). The fourth clause "client_current_billing_amount<$X" is used to check whether the requesting client's current billing amount meets a criterion before applying the PSP 305. The first two clauses are linked by Boolean "or" statements (indicated using the symbol "||"), and third and fourth clauses are linked to the other three by a Boolean "and" (using the symbol "&&").

In at least some embodiments, at least some of the parameter values indicated in the value 361 set of a PSP 305 may also have additional attributes. For example, in the depicted scenario, some parameter values may be set regardless of whether a different value was specified by the client in the request. Such values are indicated using keyword "non_overridable", as in the case of values <value3> and <value4> for parameters <param3> and <param4> respectively in value set 361A. Other values may be designated as "client_overridable", as in the case of <param5>, indicating that if the client specified a value for param5, the client-specified value would override the PSP-specified value. In other implementations, other keywords may be used to indicate the relative priority or precedence of client-specified versus PSP-specified parameter values, or the precedence rules may be defined at a different granularity. For example, in some embodiments, precedence may be designated at a PSP level instead of at a parameter level, so that any parameter value indicated within the PSP may be overridden by a corresponding client-specified one, or any client-specified parameter value may be overridden by a PSP-specified one, for example. It is noted that the keywords, tokens and syntax illustrated in FIG. 3 are provided simply as examples, and that other approaches (including other tokens or keywords for the same concepts) may be used in various embodiments.

As mentioned earlier, requests to launch guest virtual machines or compute instance may represent one example of the kinds of resource requests for which PSPs may be used in some embodiments. FIG. 4 illustrates example parameters 425 associated with a request to launch compute instances, according to at least some embodiments. Clients that submit a "launch-compute-instances" request via a programmatic interface of the VCS may specify a subset or all of the parameters shown. Others of the parameters may be generated and used internally, e.g., in the VCS control-plane, and may not even be made visible to the clients. For each parameter, FIG. 4 indicates an example precedence setting—i.e., whether a client-specified value for the parameter is to supersede or override a conflicting policy-specified value indicated in an applicable PSP (PSP-k), or whether the policy-specified value is to override a client-specified value. It is noted that parameters for a wide variety of commands and requests of various network-accessible services may be managed using PSPs in different embodiments, and that the parameters shown in FIG. 4 represent only an illustrative subset of the kinds of parameters that may be managed for a single type of resource request.

As shown, the parameters may include an instance type 401, which may be selected from among a discrete set of supported instance types such as "small", "medium", "large", or "extra-large". Each instance type may be associated with a respective combination of resource capabilities, e.g., computational power equivalent to one or more processors or cores of a particular type, a designated amount of main memory, storage space, and/or networking bandwidth. Instance count parameter 402 may indicate the number of instances of the particular type that are to be established.

In some embodiments, the provider network may comprise a plurality of data centers distributed across one or more geographically dispersed regions, and a particular region or data center in which the instance or instances are to be launched may have to be selected. Portions or all of one or more data centers may further be organized as respective availability containers as described above, such that failures that occur within one availability container would not be expected to spread to other availability containers. One or more geographic location parameters 403, and a targeted availability container parameter 404 may be used to place the requested resources in the depicted embodiment.

In some embodiments, the VCS may use public-key cryptography to encrypt and decrypt information used to log in to compute instances. To enable logging in to an instance, for example, a public-private key pair may have to be created (e.g., by the client using a key-generation API or command) prior to the instance launch in some embodiments, and the name of the key pair 405 may be provided as a parameter to the launch command. In at least one embodiment, a compute instance may have to be associated with one or more pre-created security groups 406, which act as virtual firewalls that control the types of network traffic allowed to leave and enter the instance.

In some embodiments, a given compute instance may be granted one or more "roles" with associated capabilities or permissions with respect to various types of operations that can be requested from the instance. Such roles may be defined, for example, by an administrator and stored at an identity and access management service of the provider network. In the depicted embodiment, instance role(s) parameter 407 may be used to indicate the roles to be granted to the instances that are to be launched. A tenancy mode parameter 408 may indicate whether the instance(s)

are to be launched in multi-tenant mode (in which case instances belonging to several different clients may be run on a given instance host) or in single-tenant mode (in which case only instances assigned to a single client may be run on a given instance host). OS kernel parameter 409 may indicate the specific operating system kernel to be used for the instance(s). In some embodiments, the VCS may support several different ways of setting up the storage to be used for one or more file systems (including, for example, the root file system) of an instance, and block device mapping parameter 410 may be used to select the manner in which the storage is to be configured. For example, locally-attached rotating magnetic disks may be configured for the volume or volumes to be created for the instance's file systems, locally-attached SSDs (solid state drives) may be used, or remote disks/SSDs of a block storage service (BSS) may be used.

In at least one embodiment, a machine image identifier parameter 411 may be used to indicate the software stack to be used for the instance. Clients may use machine images defined by the VCS, or create and store their own customized machine images, for example. Multiple instances may be created using a given machine image to provide a consistent software configuration for all the instances.

Networking configuration parameters for the instances, such as public and/or private IP addresses to be assigned to the instances may also be specified via parameters 412 and 413 respectively in the depicted embodiment. Public IP address may be advertised outside the provider network, and consequently instances with public IP addresses may be reachable from external networks such as the public Internet. In contrast, private IP addresses may only be accessible from within the provider network in at least some embodiments. In at least one embodiment, the VCS may provide support for setting up isolated virtual networks (IVNs) (which may sometimes be referred to as virtual private clouds or VPCs). An IVN may comprise, for example, a set of instances and/or other resources such as public or private gateways established on behalf of a client. The client may be granted substantial flexibility over the networking configuration of the IVN resources, e.g., selecting private IP address ranges to be used within the IVN, subnet configurations, and the like. An identifier 414 of the IVN within which the requested instance(s) are to be set up may be included in the list of launch-compute-instances parameters 425 in the depicted embodiment.

In some embodiments, some of the parameters associated with a client request may be generated and used internally within the provider network, and may not be exposed to the clients. Thus, for example, based on the instance type parameter 401 and/or a subset of the other parameters 425, control-plane components of the VCS may select a type of hardware host to be used as the instance host for one or more of the instances to be launched. A host specification parameter 415 used for internal instance placement requests within the VCS may indicate the host category (e.g., defined in terms of CPU types, data center location, network locations, vendor, and the like). As discussed below in further detail, in at least some embodiments the types of hosts that are available for a given instance type may change over time, e.g., as newer and more powerful hardware servers are deployed at the provider network. In one embodiment, depending on the PSPs associated with the launch-compute-instance requests, the VCS control-plane may be able to change the host specification parameter (and/or other parameters) used to launch instances without requiring approvals from the clients that request the instance launches.

In the example illustrated in FIG. 4, client-specified values for some of the parameters may potentially conflict with the values indicated in PSP-k. As shown, among the parameters 401-414, client-specified values would override conflicting PSP-specified values for parameters 401, 402, 405, 406, 407, 410, 411, 412 and 414, while PSP-specified values would override the other parameters. Parameter 415 is internal-use-only (i.e., a value for it cannot be specified directly by a client), so conflict resolution may not be required for parameter 415 in the illustrated example scenario. In general, precedence settings for resolving conflicts may be set for any given PSP for any combination of parameters for which clients are permitted to indicate values. In some embodiments, conflicts may also potentially exist between different PSPs that may apply to a given client request. In one such embodiment, the control-plane components of the service may first select the particular PSP to be used for a given request (e.g., based on precedence rules defined at the service level), and then utilize any precedence rules defined for that PSP to resolve any client-versus-PSP conflicts identified for the given request.

Example Client Interactions

Figure 5:
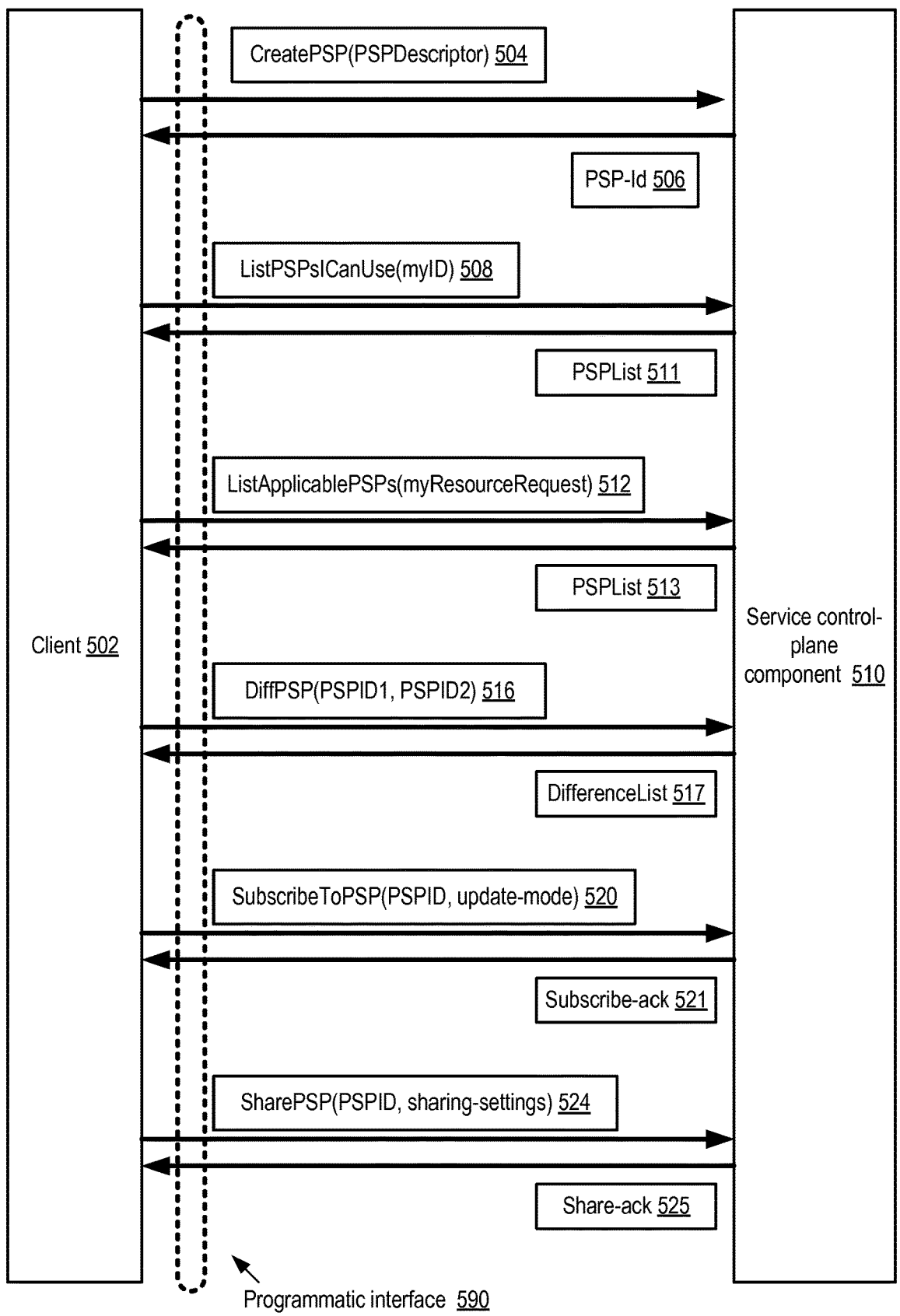
FIG. 5 illustrates examples of PSP-related control-plane interactions between a client and a network-accessible service, according to at least some embodiments.

FIG. 5 illustrates examples of PSP-related control-plane interactions between a client and a network-accessible service, according to at least some embodiments. As shown, a client 502 may submit a variety of requests to a control-plane component 510 of a given network-accessible service of the provider network via programmatic interfaces 590, including requests to create, view, or subscribe to PSPs. Programmatic interfaces 590 may comprise, for example, a set of APIs, command-line tools, one or more GUIs, web-based consoles or wizards and the like in different embodiments.

Client 502 may request the creation of a PSP using CreatePSP request 504 in the depicted embodiment, specifying various elements of the PSP such as the condition set(s) and parameter value set(s) using a PSP descriptor structure as shown. In at least some embodiments, the control-plane component 510 may validate the PSP descriptor in accordance with a PSP definition language specification 342 of the service. A PSP identifier 506 corresponding to the new PSP may be returned after the descriptor is validated successfully and the PSP is stored in the service's repository.

In at least some embodiments, a give client may be able to view or use only a subset of the PSPs stored by the service (e.g., because different subsets of the PSPs may be used for different client accounts). A given client may submit a ListPSPsICanUse command 508, indicating the client's identifier, to obtain a list of the PSPs to which the client has been granted permissions (e.g., read permissions or subscribe permissions) in the depicted embodiment. The corresponding list of PSPs 511 may be provided by the service control-plane components. In some cases, a client may wish to determine, before submitting a particular resource request, the set of PSPs (if any) that might apply to the request. The ListApplicablePSPs request 512 may be submitted in such a scenario, comprising an indication of the proposed resource request (myResourceRequest). In response, the control-plane component 510 may provide a list of zero or more PSPs 513 that would apply to the client's resource request in the depicted embodiment.

Clients that wish to determine the differences between PSPs may submit a DiffPSP request 516 specifying identifiers (PSPID1 and PSPID2) of a pair of PSPs that are to be compared. In response, the control-plane component 510 may provide a difference list 517 indicating the differences, e.g., in the condition sets or value sets of the PSPs. In at least some embodiments, clients may subscribe to specified PSPs, e.g., using a SubscribeToPSP request 520, to indicate that subsequent resource requests from the client (or from a group of clients) are to be managed using a specified PSP. An update-mode attribute of the PSP may be indicated in the subscription request 520 in some embodiments, indicating whether the service is permitted to automatically update the parameter values indicated in the PSP under some circumstances (e.g., when new versions of hardware/software become available at the provider network for the resource requests to which the subscribed PSP applies), or whether the client's approval is required for such updates. An acknowledgement 521 of the subscription may be provided by the service control-plane component 510.

In at least some embodiments, clients may wish to publish or share their PSPs with other users of the service. A request 524 to share a specified PSP, indicating sharing settings that control the manner in which the PSP is to be shared (e.g., defining a group of users or accounts to whom a PSP is to be made accessible) may be transmitted to the service control-plane. An acknowledgement message 525 indicating that the service has implemented the requested sharing may be provided to the client in the depicted embodiment. Other types of administrative interactions with respect to PSPs may be supported by various services in different embodiments, and not all the kinds of requests illustrated in FIG. 5 may be supported in some embodiments.

Figure 6:
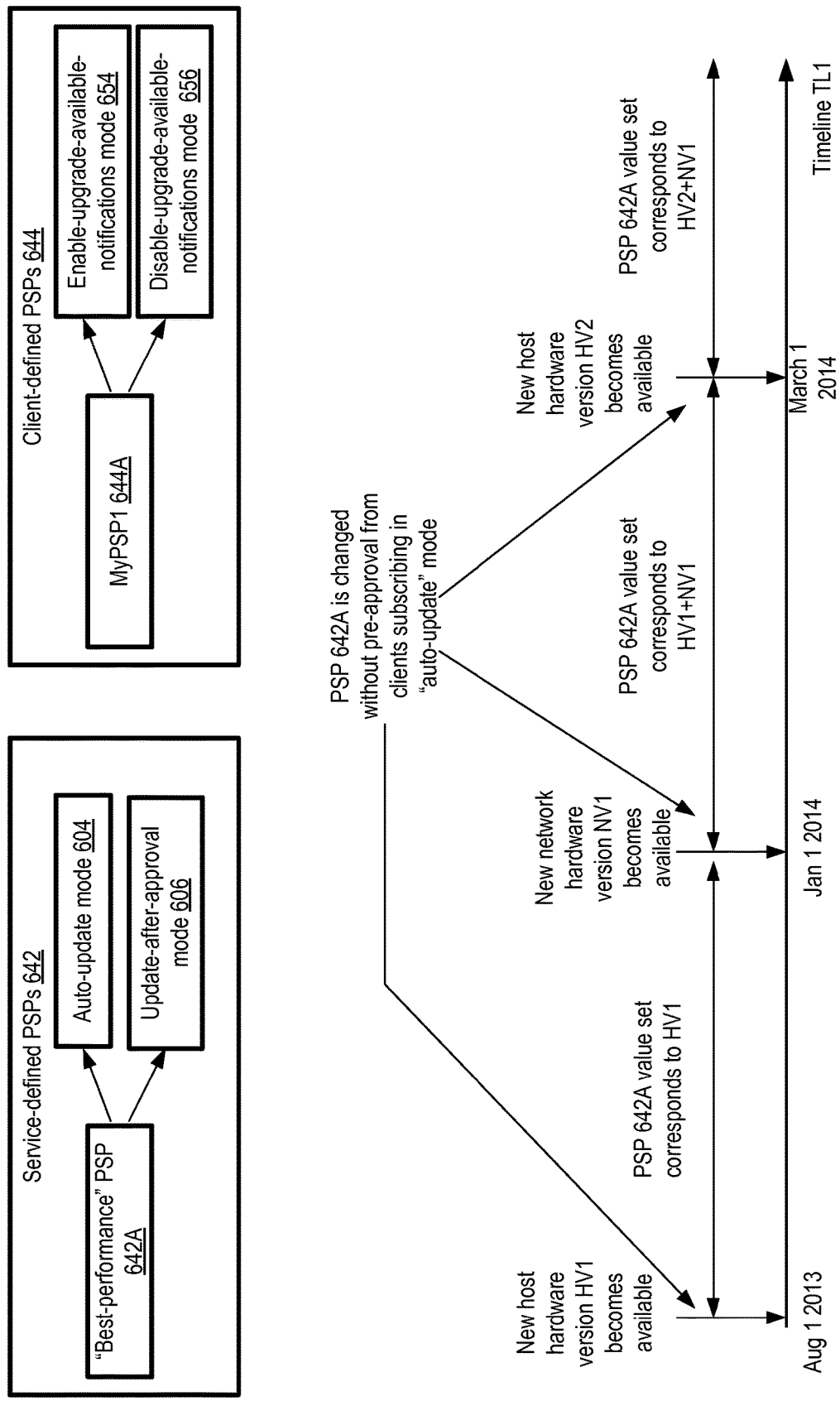
FIG. 6 illustrates example update-related attributes of service-generated PSPs and client-generated PSPs, according to at least some embodiments.

In some embodiments, it may be advisable to change the parameter value settings of various PSPs over time, e.g., as new versions of hardware and/or software products that can be used to respond to the corresponding resource requests become available. FIG. 6 illustrates example update-related attributes of service-generated PSPs and client-generated PSPs, according to at least some embodiments. Service-defined PSPs 642 may include, for example, a "best-performance" PSP 642A. In general, as implied by the name, the best-performance PSP 642A may be used for resources from which a client wishes to obtain high or optimal performance, while leaving the details of selecting parameter values for the corresponding resource requests to the service control-plane components. Thus, for example, when faster hardware hosts are deployed at a data center at which compute instances of the client may be launched in the future, the client may wish to allow the VCS to use the faster hardware hosts and make the appropriate parameter choices required for using the new hardware optimally. At least two options may be supported with respect to the manner in which the service-defined PSPs are modified in the depicted embodiment: an auto-update mode 604 and an update-after-approval mode 606. If the client selects auto-update mode 604 for the best-performance PSP 642A, the service may be permitted to change at least some parameter settings of PSP 642A as needed, without requiring explicit approval from the client for the changes. If the client selects update-after-approval mode 606, the service may be required to notify the client regarding possible changes to the parameter values to be selected when using PSP 642A, and the changes may only be applied after the client indicates approval. It is noted that not all the changes that are going to be made to the PSP may be indicated to the client in at least some implementations—e.g., while the client may be informed that different hardware may be used for at least some instance types, the details of the hardware host specification to be used for a given instance type may not be revealed to the client.

Timeline TL1 of FIG. 6 shows an example sequence of events associated with the use of a PSP 642A for which auto-update mode 604 has been set. On Aug. 1, 2013, host hardware version HV1 becomes available for an instance type covered by the PSP 642A. As a result of the use of the auto-update mode, one or more parameter values associated with instance launch requests may be modified by the VCS control-plane starting on or shortly after Aug. 1, 2013. Similarly, after new network hardware version NV1 becomes available on Jan. 1 2014, other parameter values of PSP 642A may be modified so as to utilize the new networking hardware, without obtaining approval from the client. After the introduction of NV1 and until the next relevant hardware upgrade on Mar. 1 2014, the parameter values of PSP 642A may be optimized for both the host version HV1 and the network hardware version NV1. After Mar. 1, 2014, when a new host hardware upgrade HV2 becomes available, some of PSP 642A's parameter values may be changed again without an explicit request from the client, e.g., to enable the best possible performance to be obtained for instance launch requests issued by the client.

In one embodiment, some clients may wish to be notified when hardware/software upgrades that may affect the parameter values indicated in client-specified PSPs 644 (such as "MyPSP" 644A) are implemented in the provider network. Clients may be given at least two possible options regarding possible updates to such PSPs 644 in the depicted embodiment. If enable-upgrade-available-notifications mode 654 is set for PSP 644A, the client may be notified when upgrades become available. In some embodiments, the service control-plane may even provide a list of possible change recommendations for one or more parameters whose values are selected using MyPSP 644A. If disable-upgrade-available-notifications mode 656 is set, the client may not be notified regarding the availability of new hardware or software components. Other approaches towards possible updates to client-defined and/or service-defined PSPs may be implemented in various embodiments.

Third-Party PSPs

Figure 7:
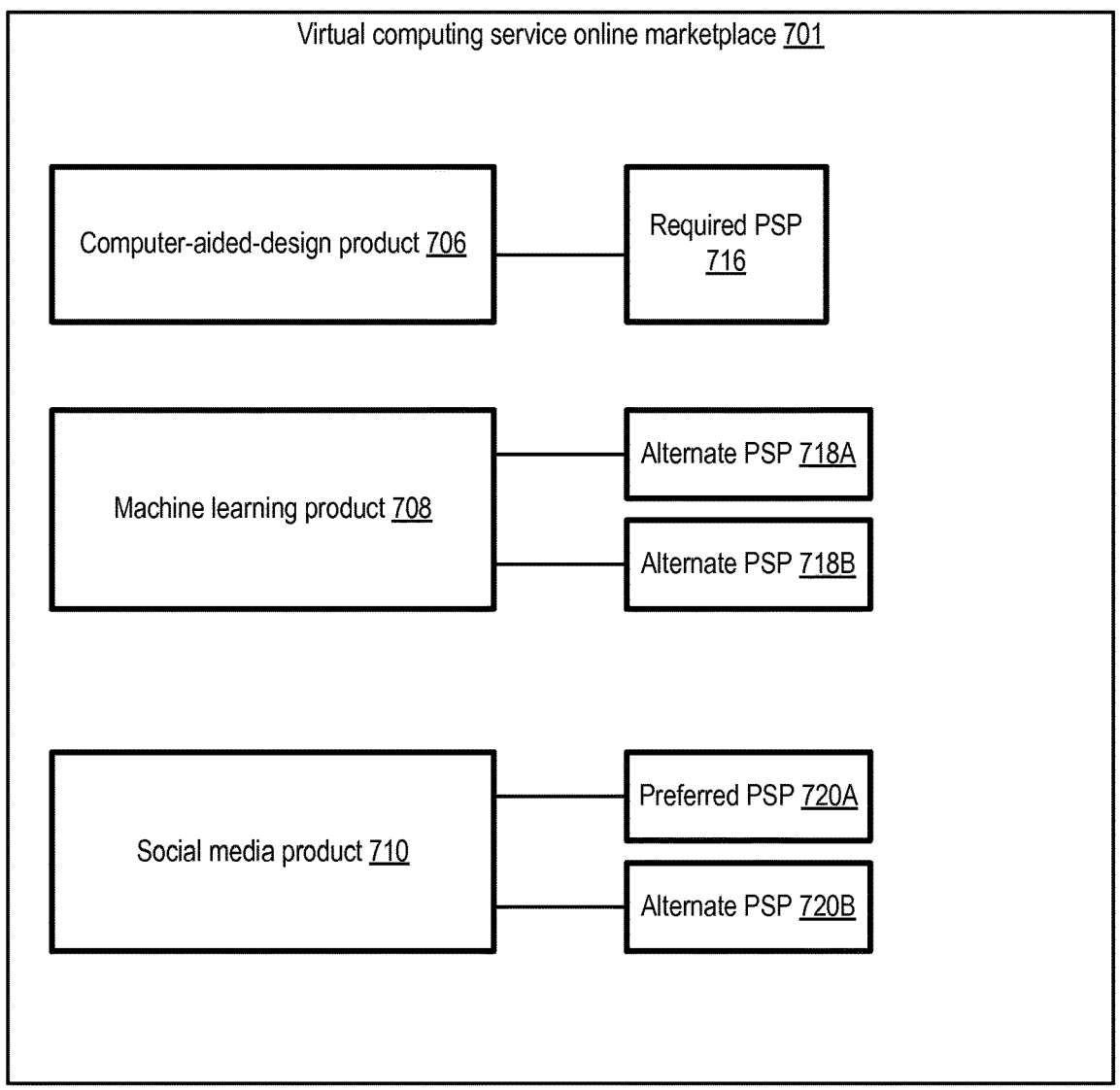
FIG. 7 illustrates examples of third party PSPs associated with products available via an online marketplace, according to at least some embodiments.

In some embodiments, as mentioned earlier, PSPs may be generated by or on behalf of third party entities, such as business partners that may sell products or services to their customers using provider network resources. FIG. 7 illustrates examples of third party PSPs associated with products available via an online marketplace, according to at least some embodiments. In the depicted embodiment, online marketplace 701 may be used by various third party vendors to advertise and sell products that can be run on compute instances of the provider network, such as a computer-aided-design (CAD) product 706, a machine learning product 708, or a social media product 710 (e.g., an application that communicates with well-known social media platforms to integrate selected social media interactions with a client company's internal databases). Each of the products 706, 708 or 710 may comprise, for example, one or more application programs that can run on compute instances that meet a respective set of configuration requirements (such as a compatible operating system version, a set of processing, networking, or storage or processing capabilities, and so on.) In one embodiment, a given marketplace product such as 706, 708 or 710 may require the use of a particular virtual machine image—that is, in order to utilize the product, a vendor-generated virtual machine image accessible via the marketplace or via the VCS may have to be used to launch a compute instance on which the product is to run.

Some vendors, such as the vendor providing CAD product 706, may generate one or more required PSPs 716 that are to be used to select various configuration parameters for compute instances that are to be used for their products. For example, such a required PSP 716 may indicate that if a virtual machine image set up for CAD product 706 is to be used to launch an instance, that instance must have a particular instance type, or a minimum amount of memory and disk space configured. In some cases, instead of mandatory or required PSPs, a vendor may generate several different alternate PSPs such as 718A and 718B which the vendor has identified as equally acceptable, from among which a client may select one to use with machine learning product 708. Other vendors may indicate one or more preferred (but not required) PSPs such as 720A, e.g., either in isolation or together with one or more alternate PSPs such as 720B. In some cases the third party PSPs may represent recommendations or suggestions rather than requirements, so that a client may decide whether they want to use a third party PSP, their own PSP, a service-defined PSP, or no PSP at all when using a particular marketplace product. In some embodiments, third party PSPs may be generated independently of products that are vended in an online marketplace such as marketplace 701—e.g., some third parties may simply sell PSPs that have been generated based on best practices with respect to certain types of applications, and such PSPs need not be directly tied to the use of any specific products being offered by the third parties. As mentioned earlier, in some embodiments PSPs may be used to enforce the equivalent of access control rules for resources associated with certain products available via an online marketplace. For example, a particular type of storage device may be required for a given marketplace product to function properly, and a PSP associated with that product may prohibit users of the product to disable or detach such a device. In at least some embodiments, PSPs of the kinds described herein may be defined and used for products of online marketplaces that are managed/implemented by entities other than the provider network operator, such as business partners of the provider network operator.

Methods for Implementing Policy-Based Resource Allocation

FIG. 8 is a flow diagram illustrating aspects of operations that may be performed to respond to administrative requests pertaining to PSPs, according to at least some embodiments. As shown in element 801, one or more programmatic interfaces (such as web-based consoles, wizards or editors, APIs, command-line tools, or GUIs) may be set up by a network-accessible service of a provider network to enable clients to request a number of different types of operations pertaining to parameter selection policies (PSPs) to be used for subsequent resource requests. The types of operations supported via the programmatic interfaces may include, for example, those illustrated in FIG. 5, such as operations to create/modify PSPs, identify sets of usable or applicable PSPs, determine differences between specified PSPs, subscribe to specified PSPs, share PSPs and the like. Each PSP created using the programmatic interfaces may include one or more condition sets to be used to determine applicability of the PSP, and one or more parameter value sets indicating the values of respective parameters to be set (e.g., for internal APIs of the service) to fulfill the resource requests to which the PSP applies.

In some embodiments, as indicated in element 804, the network-accessible service may generate and/or publish one or more service-defined PSPs such as a "best-performance" PSP or a "low-cost" PSP applicable to a given type of resource request. Clients may use the programmatic interfaces to subscribe to such service-defined PSPs in any of a number of modes of operation, including an "auto-update" mode in which the service is permitted to modify at least one parameter value setting of the PSP without requiring explicit approval from the client under some circumstances (e.g., when new types or versions of hardware or software that can be used for the corresponding resource requests become available at the provider network). In at least one embodiment, PSPs defined by third parties (such as third party vendors whose products can be run using provider network resources) may also be supported by the service.

The definitions of various PSPs, including client-defined, service-defined and/or third-party PSPs may be stored in a repository of the service (element 807), together with subscription information indicating the particular sets of candidate PSPs that should be examined for applicability to resource requests from a given client. Subsequently, addition administrative requests pertaining to the PSPs may be received via the programmatic interfaces (element 810). Control-plane components of the service may respond to such requests, e.g., by providing the appropriate query results for read-only requests and by saving accepted modifications to the repository.

Figure 9:
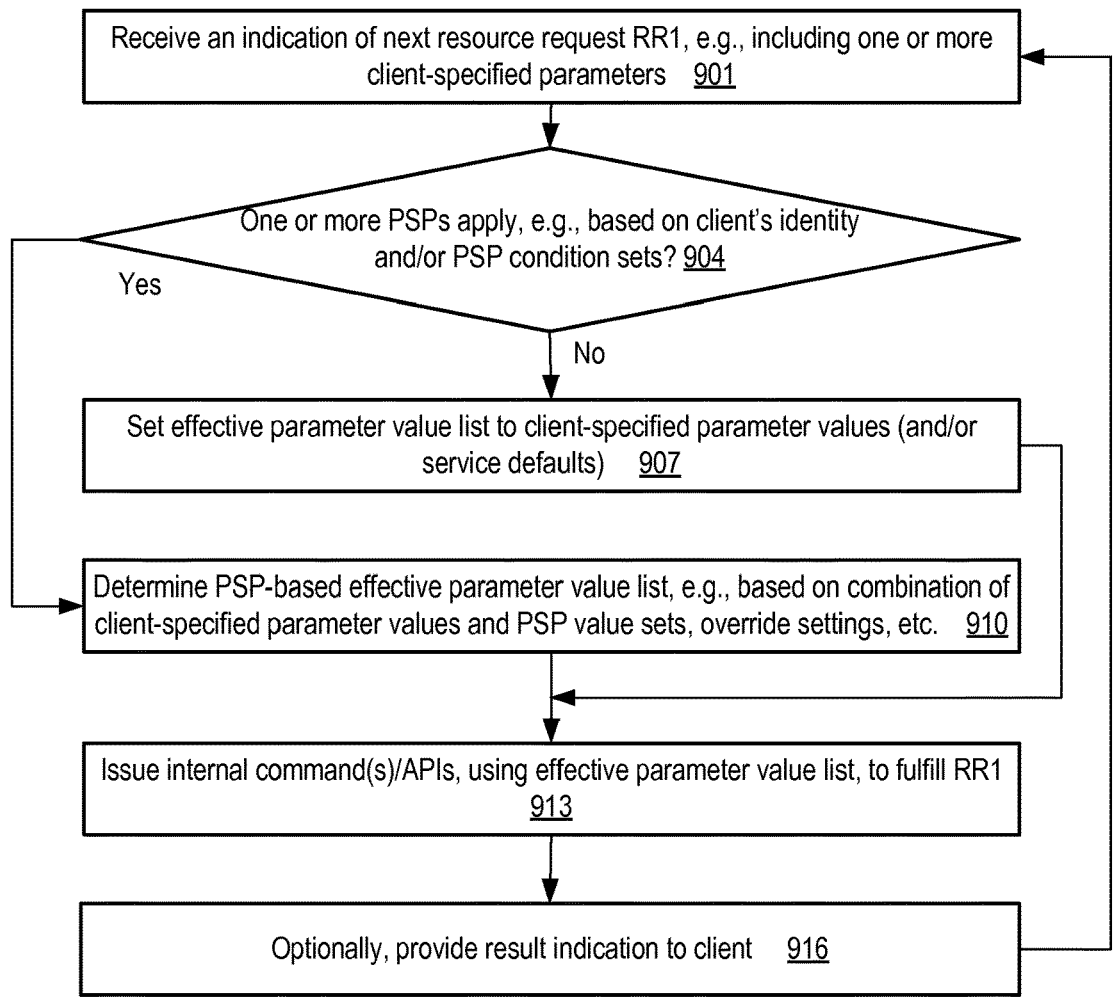
FIG. 9 is a flow diagram illustrating aspects of operations that may be performed in response to client resource requests at a network-accessible service at which PSPs are supported, according to at least some embodiments.

FIG. 9 is a flow diagram illustrating aspects of operations that may be performed in response to client resource requests at a network-accessible service at which PSPs are supported, according to at least some embodiments. As shown in element 901, one or more control-plane components of a network-accessible service of a provider network may receive an indication of a resource request RR1 submitted by a client of the service (e.g., either from a computing device outside the provider network, or from a device inside the provider network such as a component of another service). Request RR1 may include zero or more client-specified parameter values to be used for configuring the service resourced needed to respond to the request. In at least some embodiments metadata indicative of the client's identity may also be obtained from RR1—e.g., either an explicit client identifier or account identifier may be included in RR1, or the client's identity may be deduced from other attributes such as a source network address from which RR1 is reduced, a connection identifier, and so on.

The control-plane components of the service may determine whether any PSPs that apply to RR1 are present in the service's PSP repository. The client's identity, either in isolation or in combination with the condition sets defined for the different PSPs stored in the repository, may be used to identify applicable PSPs in various embodiments. If no applicable PSPs are found (as determined in element 904), the parameter values specified by the client for RR1 (if any) as well as default parameter values defined by the service may be used to generate one or more effective parameter value lists (e.g., parameter values to be used for internal commands or API calls generated by the control-plane components in response to RR1) used to fulfill RR1.

If one or more applicable PSPs are found (as also determined in element 904), one or more effective parameter value lists may be determined based on the parameter value sets indicated in the applicable PSPs and the client-specified parameter values (if any). If a client-specified parameter value differs from the corresponding parameter value indicated in a PSP, a precedence rule or override setting may be used to determine which of the two values should be used. Such precedence rules or override settings may be applied at different granularities in various embodiments—e.g., at the level of an individual parameter, or at the level of the PSP as a whole. The appropriate internal commands or API calls may then be issued, using the effective parameter list(s) generated based on the applicable PSPs (and/or the client-specified parameter values if no PSPs apply) (element 913).

In at least some embodiments, RR1 may in effect be reissued with the effective parameter value list; that is, the same type of request that was received from the client may be reissued with a more complete parameter value list than was initially received from the client. An indication of the result(s) of the commands or calls for which the effective parameter value list was generated may be provided to the client in some embodiments (element 916).

It is noted that in various embodiments, operations other than those illustrated in the flow diagrams of FIG. 8 and FIG. 9 may be used to implement at least some of the techniques for supporting policy-based resource allocation discussed herein. Some of the operations shown may not be implemented in some embodiments, may be implemented in a different order than illustrated in FIG. 8 or FIG. 9, or in parallel rather than sequentially.

Use Cases

The techniques described above, of providing support for policy-based responses to resource allocation requests directed to one or more services of a provider network may be useful in a variety of scenarios. As the sophistication and complexity of the functionality supported at provider networks increases, the number of configuration choices that may have to be made by service customers may become so large that it may become difficult for customers to issue resource requests with the needed combinations of parameter values. Some clients may wish to make only a small set of parameter setting choices, leaving the rest to the service provider. In addition, at least some business entities (as well as some services of the provider network) may wish to enforce various consistency rules regarding resource configurations—e.g., if a choice C1 is made for one configuration parameter associated with a requested resource, a choice C2 may be desired for a different configuration parameter. The ability to create (or subscribe to) a small set of parameter selection policies of the kind described above, which enable parameter values to be selected consistently based on some combination of client preferences and policy-specified rules, may considerably simplify the task of allocating resources at provider network services. Third parties such as vendors selling products within online marketplaces implemented at a provider network may also be able to enforce consistency with regard to the resources to be used with their products.

Illustrative Computer System

Figure 10:
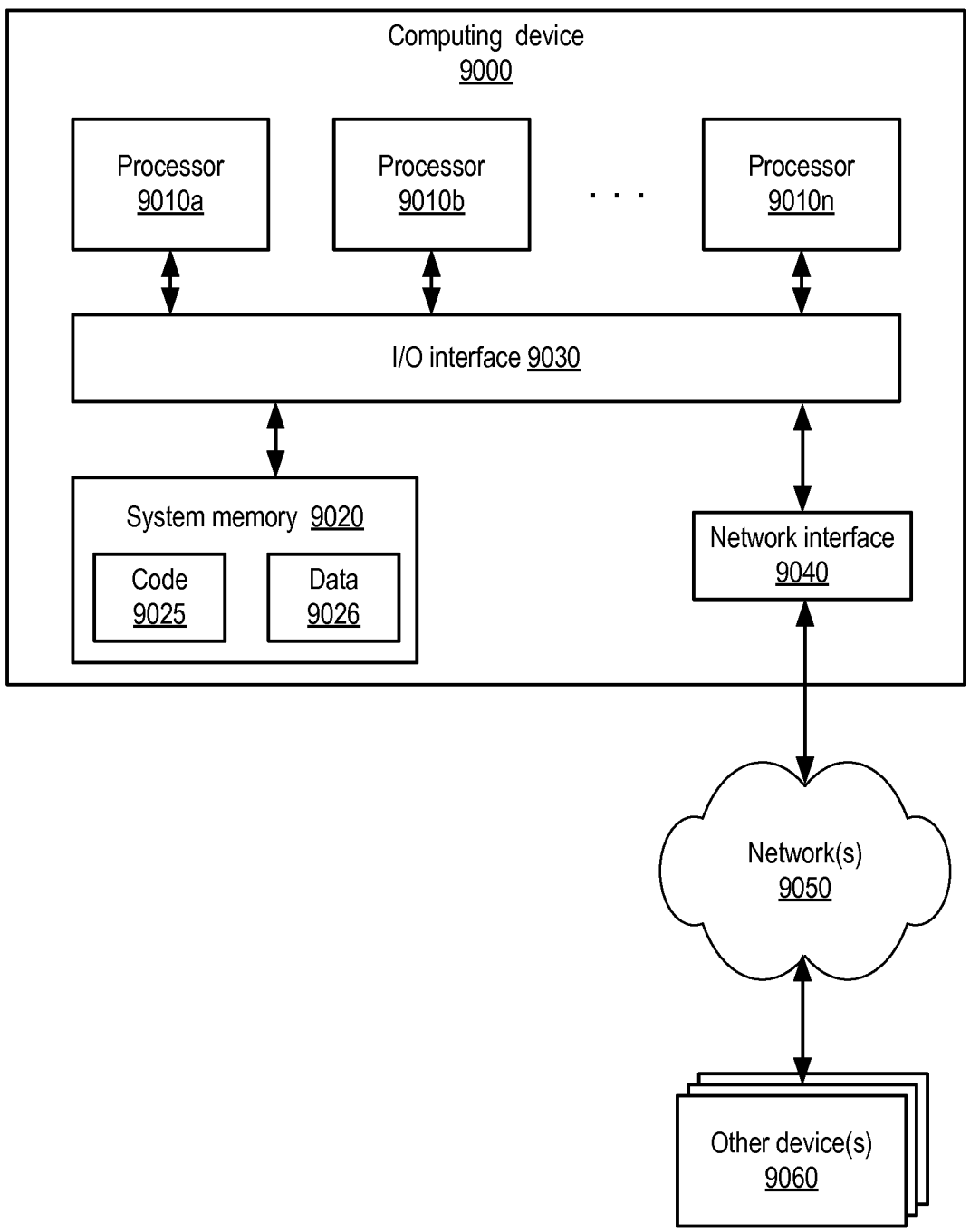
FIG. 10 is a block diagram illustrating an example computing device that may be used in at least some embodiments.

In at least some embodiments, a server that implements one or more of the techniques described above for supporting parameter selection policies for service resources at provider networks may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more control-plane components of a network-accessible service implemented at a provider network;
wherein the network-accessible service is configured to allocate resources to a plurality of clients in response to resource requests from the clients; and
wherein the one or more control-plane components are configured to:
store respective representations of a plurality of parameter selection policies (PSPs) that automatically select configuration parameters of resources to be allocated to fulfill resource requests to the network-accessible service, wherein a first PSP of the plurality of PSPs comprises at least (a) a condition set that indicates one or more parameter values to be matched against parameters values specified by individual resources requests for new resources, the condition set to be used to determine whether the first PSP is applied to the resource request and (b) a value set indicating one or more configuration parameter values to modify the set of one or more configuration parameters of the resource request if the condition set is satisfied;
receive an indication that a particular resource request has been submitted by a particular client, wherein the particular resource request includes respective client-specified values of one or more configuration parameters of a requested resource;
determine that identity metadata associated with the particular client corresponds to an identity specified for the first PSP and the client-specified values of the one or more configuration parameters satisfy the condition set of the first PSP, and in response:
apply the first PSP to the particular resource request to generate an effective parameter value list to be used for an invocation of an (application programming interface (API) corresponding to the particular resource request, based at least in part on:
(a) the value set of the first PSP, and
(b) the client-specified values of the one or more configuration parameters;
wherein the effective parameter value list includes at least one parameter value that is not included in the client-specified values; and
initiate, using the effective parameter value list, an allocation of one or more requested resources to fulfill the particular resource request.

2. The system as recited in claim 1, wherein the network-accessible service comprises a virtual computing service, and wherein the particular resource request comprises a request to launch at least one guest virtual machine at an instance host of the virtual computing service.

3. The system as recited in claim 2, wherein the effective parameter value list includes one or more of: (a) an identifier of a virtual machine image to be used for the guest virtual machine, (b) an instance type of the guest virtual machine, (c) an instance count, (e) a security key, (f) a security group, (g) a role defined by an identity and access management service, (h) a targeted availability container for the guest virtual machine, (i) a tenancy indicator, (j) an operating system kernel identifier, (k) a block device mapping, (l) an Internet Protocol (IP) address to be assigned to the guest virtual machine, (m) a preferred geographical location indicator, or (n) a hardware specification for a host at which the guest virtual machine is to be instantiated.

4. The system as recited in claim 1, wherein the one or more control-plane components are further configured to:
implement one or more programmatic interfaces enabling clients of the network-accessible service to (a) view definitions of one or more service-defined PSPs and (b) subscribe to a selected service-defined PSP of the one or more service-defined PSPs.

5. The system as recited in claim 1, wherein the one or more control-plane components are further configured to:
receive, via a programmatic interface, an indication of a particular client-generated PSP from a client;

validate the particular client-generated PSP based at least in part on a PSP language specification of the network-accessible service; and save a representation of the particular client-generated PSP in a repository.

6. A method, comprising:

performing, by one or more control-plane components of a network-accessible service of a provider network:

storing respective representations of one or more parameter selection policies (PSPs) associated with a network-accessible service that automatically select configuration parameters of resources to be allocated to fulfill resource requests directed to the network-accessible service, wherein a first PSP of the one or more PSPs comprises at least (a) a condition set indicating one or more parameter values to be matched against parameters values specified by individual resources requests for new resources to determine whether the first PSP is applied to the resource request and (b) a value set indicating a value to modify at least one configuration parameter of a resource requests to which the first PSP applies;

receiving an indication that a particular resource request has been submitted by a particular client, wherein the particular resource request includes respective client-specified values of one or more configuration parameters of a requested resource;

determining that an identity metadata associated with the particular client corresponds to an identity specified for the first PSP, and that the client-specified values of the one or more configuration parameters satisfy the condition set for applying the first PSP, and in response:

applying the first PSP to the particular resource request to generate, based at least in part on the value set of the first PSP, an effective parameter value list to be used for an operation corresponding to the particular resource request, wherein the effective parameter value list includes a parameter value that is not included in the client-specified values; and initiating, using the effective parameter value list, an allocation of one or more resources to fulfill the particular resource request.

7. The method as recited in claim 6, wherein the network-accessible service comprises a virtual computing service, and wherein the particular resource request comprises a request to launch at least one guest virtual machine at an instance host of the virtual computing service.

8. The method as recited in claim 7, wherein the effective parameter value list includes one or more of: (a) an identifier of a virtual machine image to be used for the guest virtual machine, (b) an instance type of the guest virtual machine, (c) an instance count, (e) a security key, (f) a security group, (g) a role defined by an identity and access management service, (h) a targeted availability container for the guest virtual machine, (i) a tenancy indicator, (j) an operating system kernel identifier, (k) a block device mapping, (l) an Internet Protocol (IP) address to be assigned to the guest virtual machine, (m) a preferred geographical location indicator, or (n) a hardware specification for a host at which the guest virtual machine is to be instantiated.

9. The method as recited in claim 6, wherein the network-accessible service comprises a storage service implementing a block-device level programmatic interface, and wherein the particular resource request comprises a request to create a storage volume.

10. The method as recited in claim 6, further comprising performing, by one or more components of the network-accessible service:

implementing one or more programmatic interfaces enabling clients of the network-accessible service to (a) view definitions of one or more service-defined PSPs and (b) subscribe to a selected service-defined PSP of the one or more service-defined PSPs.

11. The method as recited in claim 10, further comprising performing, by the one or more components:

receiving, from a particular client, an indication of an automated update mode to be used for the selected service-defined PSP, wherein, in accordance with the automated update mode, the network-accessible service is permitted to modify at least one value of the value set of the selected service-defined PSP without receiving a request from the particular client to modify the at least one value.

12. The method as recited in claim 6, further comprising performing, by one or more components of the network-accessible service:

receiving, via a programmatic interface, an indication of a particular client-generated PSP from a client;

validating the particular client-generated PSP based at least in part on a PSP language specification of the network-accessible service; and saving a representation of the particular client-generated PSP in a repository.

13. The method as recited in claim 6, wherein the first PSP includes a client-override setting associated with a particular configuration parameter for which a policy-specified value is included in the value set, wherein the client-override setting indicates that, in response to receiving an indication of a client-specified value for the particular configuration parameter, the one or more control-plane components are to use the client-specified value instead of the policy-specified value to allocate a requested resource.

14. The method as recited in claim 6, wherein the condition set indicates a plurality of Boolean conditions connected using two or more different types of Boolean operators.

15. The method as recited in claim 6, further comprising performing, by one or more components of the network-accessible service:

implementing one or more programmatic interfaces enabling a client to obtain an indication of one or more PSPs applicable to a different resource request.

16. The method as recited in claim 6, further comprising performing, by one or more components of the network-accessible service:

implementing one or more programmatic interfaces enabling a client to obtain an indication of one or more differences between the first PSP and a second PSP of the one or more PSPs.

17. The method as recited in claim 6, wherein the one or more PSPs includes a particular PSP applicable to a client resource request associated with a particular product available from an online marketplace.

18. A non-transitory computer-accessible storage medium storing program instructions that when executed on one or more processors implements one or more control-plane components of a network-accessible service, wherein the one or more control-plane components are configured to:

store one or more parameter selection policies (PSPs) associated with the network-accessible service that automatically select configuration parameters of resources to be allocated to fulfill resource requests directed to the network-accessible service, including a first PSP that indicates at least (a) a condition set that indicates one or more parameter values to be matched against parameters values specified by individual resources requests for new resources to determine whether the first PSP is applied to the resource request and (b) a value set indicating a value to modify at least one configuration parameter of resource requests to which the first PSP applies;

receive an indication that a particular resource request has been submitted by a particular client of the network-accessible service, wherein the particular resource request includes respective client-specified values of one or more configuration parameters of a requested resource;

determine that the first parameter selection policy (PSP) of the one or more PSPs is applicable to the particular resource request, based at least in part on a determination that an identity metadata associated with the particular client corresponds to an identity specified for the first PSP and that the client-specified values of the one or more configuration parameters satisfy the condition set specified for the first PSP;

apply the first PSP to generate, based at least in part on the value set of the first PSP, an effective parameter value list to be used for an operation to allocate one or more resources corresponding to the particular resource request, wherein the effective parameter value list includes a parameter value that is not included in the client-specified values; and initiate, using the effective parameter value list, the operation to allocate the one or more resources.

19. The non-transitory computer-accessible storage medium as recited in claim 18, wherein the network-accessible service comprises a virtual computing service, and wherein the particular resource request comprises a request to launch at least one guest virtual machine at an instance host of the virtual computing service.

20. The non-transitory computer-accessible storage medium as recited in claim 19, wherein the effective parameter value list includes one or more of: (a) an identifier of a virtual machine image to be used for the guest virtual machine, (b) an instance type of the guest virtual machine, (c) an instance count, (e) a security key, (f) a security group, (g) a role defined by an identity and access management service, (h) a targeted availability container for the guest virtual machine, (i) a tenancy indicator, (j) an operating system kernel identifier, (k) a block device mapping, (l) an Internet Protocol (IP) address to be assigned to the guest virtual machine, (m) a preferred geographical location indicator, or (n) a hardware specification for a host at which the guest virtual machine is to be instantiated.

* * * * *